United States Patent Office 3,848,059
Patented Nov. 12, 1974

3,848,059
INORGANIC MICROSPHERES BY A DOUBLE EMULSION TECHNIQUE
Modesto Erneta, Princeton Junction, N.J., assignor to N L Industries, Inc., New York, N.Y.
No Drawing. Filed Dec. 22, 1972, Ser. No. 317,676
Int. Cl. C01f 5/00, 5/24, 5/40, 7/00, 7/74, 11/00, 11/18, 11/46
U.S. Cl. 423—327                                        1 Claim

ABSTRACT OF THE DISCLOSURE

Spheroidal shaped reticulated microparticles of water insoluble inorganic salt have been prepared as the double decomposition reaction product of two water soluble salts dissolved in the water droplets of two water-in-oil emulsions.

The water insoluble salts produced are salts in which the cation is selected from the group consisting of magnesium, calcium, strontium, barium and aluminum and the anion is selected from the group consisting of silicate, carbonate and sulfate.

BACKGROUND OF THE INVENTION

Various types of microspheres and microcapsules have been produced by a variety of methods. Among those which have been produced are polymeric compositions made from the polymers and prepolymers which are formed from various emulsion systems, including water-in-oil emulsions. U.S. Pats. Nos. 3,784,391 and 3,585,149 are two such processes for producing microcapsules.

In the instant invention, however, a new type of spheroidal microparticle has been produced by a double water-in-oil emulsion technique to produce microparticles of water insoluble inorganic compound.

SUMMARY OF THE INVENTION

Spheroidal shaped reticulated microparticles of a water insoluble inorganic salt have been prepared in which the cation of said salt is selected from the group consisting of magnesium, calcium, strontium, barium and aluminum and the anion of said salt is selected from the group consisting of silicate, carbonate and sulfate. The microparticles produced have an average individual size of from 0.1 to 5.0 microns.

These spheroidal shaped water insoluble inorganic microparticles are produced by the double decomposition reaction of two water soluble salts. These salts are dissolved in the water droplets of two separately prepared water-in-oil emulsions and upon mixing the emulsions, the salts in the water droplets from each emulsion contact one another and the two salts immediately react with one another to form the decomposition products. One of the decomposition products is the water insoluble salt while the other salt product is water soluble. The oil portion is then separated from the water droplets containing the decomposition products and then the soluble salt in the water droplets is removed from the water insoluble salt formed. The insoluble salt is then dried to form the microparticles.

DESCRIPTION OF THE PREFERRED EMBODIMENTS

In order to produce the spheroidal shaped microparticles of the water insoluble compound, it is necessary to select two water soluble salts which when reacted with one another form double decomposition products in which one salt product is water insoluble while the other decomposition product is water soluble.

Two water-in-oil emulsions are produced, each of which contains one of the water soluble salts dissolved in the water droplets of each emulsion.

In preparing each emulsion the soluble salt is dissolved in water and the water salt solution is admixed with oil with high shear to form water droplets of size from $0.1\mu$ to $5.0\mu$.

The concentration of salt in either emulsion is not greater than the solubility in water of either salt used and in addition is not greater than the solubility of the water soluble salt formed as one of the double decomposition products formed.

After the water-in-oil emulsions are prepared, the two emulsions are mixed together with agitation. Since heat harms emulsion stability, it is desirable to prepare the two separate water-in-oil emulsions at temperatures from about 5–15° C.

The temperature of the mixed emulsion can then be increased to about 30° C. to 40° C. in order to bring about faster reaction due to increased interparticle collision.

The type of oil used to form the water-in-oil emulsion may be either an aliphatic or an aromatic hydrocarbon. Among those which are particularly effective are hexane, heptane, dodecane, mineral spirits, mineral oil or benzene, toluene and xylene. The amount of oil employed in preparing the emulsions should be from ⅓ to 3 parts by weight for each part of water.

When the two emulsions are mixed together, the soluble salt in the water bubbles from one emulsion contacts the soluble salt in the water bubbles from the other emulsion and the two salts immediately react with one another producing the double decomposition products in both of the water bubbles. The water insoluble salt formed precipitates inside the water bubbles which also contain the newly formed water soluble salt as the other decomposition product.

The water bubbles containing the double decomposition products are then separated from the oil fraction by settling, centrifuging or decantation processes. The water insoluble salt is then removed from the water soluble salt by filtration and after washing, the water insoluble salt is dried and recovered as spherical shaped microparticles of the insoluble salt having an average particle which falls within the range of $0.1\mu$ to $5.0\mu$.

It has been found that the size of the water bubbles formed in the original two emulsions determines the size of the final spherical shaped microparticles of the water insoluble salt.

In order to describe the instant invention in more detail, the following examples are presented:

EXAMPLE 1

In this example the microspheres of calcium carbonate were prepared by the double emulsion technique of the instant invention.

A water-in-oil emulsion containing calcium chloride in the water bubbles of said emulsion was prepared as follows:

73.5 grams of $CaCl_2 \cdot 2H_2O$ were dissolved in 200 grams of water. This calcium chloride solution was mixed in a high speed blender with 200 grams of mineral spirits and 2 grams of a water-in-oil emulsifying agent. Water droplets containing the calcium chloride were formed in the emulsion and had an average particle size of about 1.5 microns.

Another water-in-oil emulsion was prepared in the same manner using 69 grams of potassium carbonate dissolved in 200 grams of water and 200 grams of mineral spirits containing 2 grams of the emulsifying agent. The water droplets containing the potassium carbonate were formed in the emulsion and had an average particle size of about 1.0 micron.

These two emulsions were admixed with agitation and heated up to 35° C. The water bubbles containing the dissolved salts upon contact with one another reacted immediately to form the double decomposition products of water insoluble calcium carbonate and water soluble potassium chloride. Both of these products were held in the water bubbles present in the mixed emulsions. The water bubbles containing the salt products remained substantially the same size as the water bubbles originally formed in the two separate emulsions.

The mixed emulsion was then centrifuged and the oil phase was separated from the water phase. The water phase containing the double decomposition products was then filtered, washed well with water and alcohol to remove the water soluble potassium chloride from the water insoluble calcium carbonate.

After drying, the calcium carbonate was examined under a microscope and it was found that the particles were spheroidal in shape and had an average particle size of 1.0 micron.

EXAMPLE 2

In this example spheroidal shaped microparticles of aluminum silicate were prepared as follows:

200 grams of a sodium silicate solution containing 14% $SiO_2$ was prepared in which the sodium silicate employed contained 3.75 parts of $SiO_2$ for each part of $Na_2O$.

This solution was added with high shear to 200 grams of mineral spirits and 2 grams of a water-in-oil emulsifying agent. Water droplets containing the sodium silicate were formed and had an average size of 2 microns.

46.18 grams of $Al_2(SO_4)_3 \cdot 18H_2O$ were dissolved in 180 grams of water and this solution was added to 200 grams of mineral spirits and 2 grams of an emulsifying agent to form another water-in-oil emulsion having water droplets of an average size of 3 microns.

Upon mixing the two emulsions in the same manner as that described in Example 1, the two salts in the water droplets formed double decomposition products of insoluble aluminum silicate and soluble sodium sulfate when the water droplets from each of the emulsions contacted one another.

After the oil phase was removed, the water soluble salt was separated from the water insoluble salt by filtration and washing.

Upon drying, spheroidal shaped microparticles were formed which had an average particle size of microns.

EXAMPLES 3–6

In these examples various water insoluble compounds were prepared by the double decomposition reaction of two salts dissolved in the water droplets of two water-in-oil emulsions. The same procedure as that described in the other examples was used.

In Example 3, $BaSO_4$ was prepared by the reaction of $BaCl_2$ with $(NH_4)_2SO_4$.

In Examples 4–5, $MgCO_3$ and $SrCO_3$ were prepared by the reaction of $Na_2CO_3$ with $MgCl_2$ and $SrCl_2$ respectively.

In Example 6, calcium silicate was prepared by the reaction of $CaCl_2 \cdot 2H_2O$ with sodium silicate.

Again in all of these examples spheroidal shaped microparticles were prepared having an average particle size of 0.03–5 microns.

The operational details and results obtained for all of these examples are recorded in the following table.

TABLE

| Example number | 1 | 2 | 3 | 4 | 5 | 6 |
|---|---|---|---|---|---|---|
| First emulsion | | | | | | |
| Variable ingredient | $CaCl_2 \cdot 2H_2O$ (75.3 g.) | 14% $SiO_2$ (200 g.) ($Na_2O \cdot 3.75 SiO_2$) | $BaCl_2 \cdot 2H_2O$ (15 g.) | $MgCl_2 \cdot 6H_2O$ (20.3 g.) | $SrCl_2 \cdot 6H_2O$ (26.6 g.) | $CaCl_2 \cdot 2H_2O$ (137.25 g.) |
| Water | 200 g | 200 g | 150 g | 150 g | 100 g | 1,500 g. |
| Mineral spirits | 200 g | 200 g | 200 g | 200 g | 200 g | 1,080 g. |
| Emulsifier | 2 g | 2 g | 2 g | 2 g | 2 g | 15 g. |
| Second emulsion | | | | | | |
| Variable ingredient | $K_2CO_3$ (69 g.) | $Al_2(SO_4)_3 \cdot 18H_2O$ (46.18 g.) | $(NH_4)_2SO_4$ (8.1 g.) | $Na_2CO_3$ (10.6 g.) | $Na_2CO_3$ (10.6 g.) | 14% $SiO_2$ (1,500 g.) ($Na_2O \cdot 3.75 SiO_2$) |
| Water | 200 g | 180 g | 150 g | 170 g | 170 g | 1,500 g. |
| Mineral spirits | 200 g | 200 g | 200 g | 200 g | 200 g | 1,080 g. |
| Emulsifier | 2 g | 2 g | 2 g | 2 g | 2 g | 15 g. |
| Double decomposition products | | | | | | |
| Water soluble | KCl | $Na_2SO_4$ | $NH_4Cl$ | NaCl | NaCl | NaCl. |
| Water insoluble | $CaCO_3$ | $Al_2O \cdot 11.25 SiO_2$ | $BaSO_4$ | $MgCO_3$ | $SrCO_3$ | $CaO \cdot 3.75 SiO_2$. |
| Micron size | 1.0 | 2.0 | 3.0 | 0.1 | 5.0 | 0.3. |

All of the water insoluble salts possess pigmentary properties.

In order to show the usefulness of the water insoluble salts produced, the following test was performed:

Ten grams of the calcium silicate produced in Example 6 were dispersed in 14 grams of a 1% sodium hexametaphosphate water solution. To this slurry were added 5.1 grams of an acrylic latex vehicle. Films were then laid down on opacity charts, form 3B the Lenneta Company, using a .010″ doctor blade. Contrast ratio values were determined by measuring the reflectance of the films over the black and the white portions of the opacity charts using a colormaster differential colormeter (Manufacturers Engineering and Equipment Corp., Hatboro, Pa.). The contrast ratio is defined as the ratio of the black background reflectance over the white background reflectance; using green light. With this example the following results were obtained:

Contrast ratio (green light) = 91.67/94.3 = .975

As a comparison, samples of calcium silicate prepared by precipitation of water solution of $CaCl_2 \cdot 2H_2O$ and sodium silicate gave poorer pigmentary properties (lower contrast ratio).

From the above description and by the examples presented, it has clearly been shown that useful spheroidal shaped microparticles of water insoluble inorganic compounds may be produced by the process of the instant invention. The size of the microparticles produced is determined by the size of the water bubbles present in the two water-in-oil emulsions which contain the two water soluble salts.

While this invention has been described and illustrated by the examples shown, it is not intended to be strictly limited thereto, and other variations and modifications may be employed within the scope of the following claim.

What is claimed is:

1. A method for preparation of spheroidal shaped reticulated microparticles of a water insoluble inorganic salt which comprises forming a water-in-oil emulsion containing a water soluble inorganic salt in the water droplets of said water-in-oil emulsion, forming a second water-in-oil emulsion containing another water soluble inorganic salt in the water droplets of said second water-in-oil emulsion, mixing the two water-in-oil emulsions, said water droplets containing the two water soluble salts, contacting one another and said salts immediately reacting with one another to form double decomposition products in which one salt product is water insoluble and the other salt product is water soluble, separating the oil portion from said water droplets containing the double decomposition products, removing the water soluble salt in the water droplets from said water insoluble salt, and drying said water insoluble salt; the cation portion of said water insoluble salt selected from the group consisting of magnesium, calcium, strontium, barium and aluminum and the anion portion of said salt selected from the group consisting of silicate, carbonate and sulfate.

References Cited

UNITED STATES PATENTS

| | | | |
|---|---|---|---|
| 2,948,701 | 8/1960 | Baker et al. | 423—331 X |
| 3,264,130 | 8/1966 | Mays | 423—326 X |
| 2,044,942 | 6/1936 | Heckert | 423—555 |
| 3,347,624 | 10/1967 | Taylor | 423—430 |
| 2,125,342 | 8/1938 | Hall et al. | 423—554 |
| 2,921,839 | 1/1960 | Ritter | 423—339 |

HERBERT T. CARTER, Primary Examiner

U.S. Cl. X.R.

423—331, 419, 430, 431, 554, 555, 556, 659